United States Patent
Muck et al.

(10) Patent No.: US 8,973,994 B2
(45) Date of Patent: Mar. 10, 2015

(54) VARIABLE LUMBAR SUPPORT ASSEMBLY

(71) Applicant: Toyota Motor Engineering & Manufacturing North America, Inc., Erlanger, KY (US)

(72) Inventors: Todd Rupert Muck, Fowlerville, MI (US); John Fredrik Runske, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 163 days.

(21) Appl. No.: 13/755,732

(22) Filed: Jan. 31, 2013

(65) Prior Publication Data

US 2014/0210240 A1     Jul. 31, 2014

(51) Int. Cl.
*B60N 2/66*     (2006.01)

(52) U.S. Cl.
CPC ....................................... *B60N 2/66* (2013.01)
USPC .................................... 297/284.7; 297/284.8

(58) Field of Classification Search
USPC ...................... 297/284.4, 284.6, 284.7, 284.8
See application file for complete search history.

(56) References Cited

U.S. PATENT DOCUMENTS

| | | | |
|---|---|---|---|
| 4,295,681 A | 10/1981 | Gregory | |
| 4,313,637 A | 2/1982 | Barley | |
| 4,502,728 A * | 3/1985 | Sheldon et al. | 297/284.7 |
| 5,112,106 A * | 5/1992 | Asbjornsen et al. | 297/284.7 |
| 5,460,427 A * | 10/1995 | Serber | 297/216.19 |
| 6,260,921 B1 | 7/2001 | Chu et al. | |
| 6,354,662 B1 * | 3/2002 | Su | 297/284.7 |
| 7,344,194 B2 * | 3/2008 | Maier et al. | 297/284.7 |
| 7,641,283 B2 * | 1/2010 | Rumack | 297/219.12 |
| 8,162,399 B2 * | 4/2012 | Demontis et al. | 297/284.4 |
| 2009/0115235 A1 * | 5/2009 | Bock | 297/284.7 |
| 2010/0078974 A1 * | 4/2010 | Nathan | 297/217.3 |
| 2011/0101748 A1 * | 5/2011 | Goetz | 297/284.4 |

* cited by examiner

*Primary Examiner* — Milton Nelson, Jr.
(74) *Attorney, Agent, or Firm* — Gifford, Krass, Sprinkle, Anderson & Citkowski, P.C.

(57) ABSTRACT

A variable lumbar support assembly for a seatback of a vehicle seat assembly includes a support bracket and a lumbar member. The support bracket has an upper end, an opposite lower end, and a pair of side rails extending between the upper end and the lower end. The support bracket has a curved central portion positioned between the upper and the lower end. The lumbar member is slidingly attached to the pair of side rails of the support bracket. The slidingly attachment of the lumbar member along the pair of slide rails provides both a vertical displacement and a fore and aft displacement of the lumbar member.

20 Claims, 12 Drawing Sheets

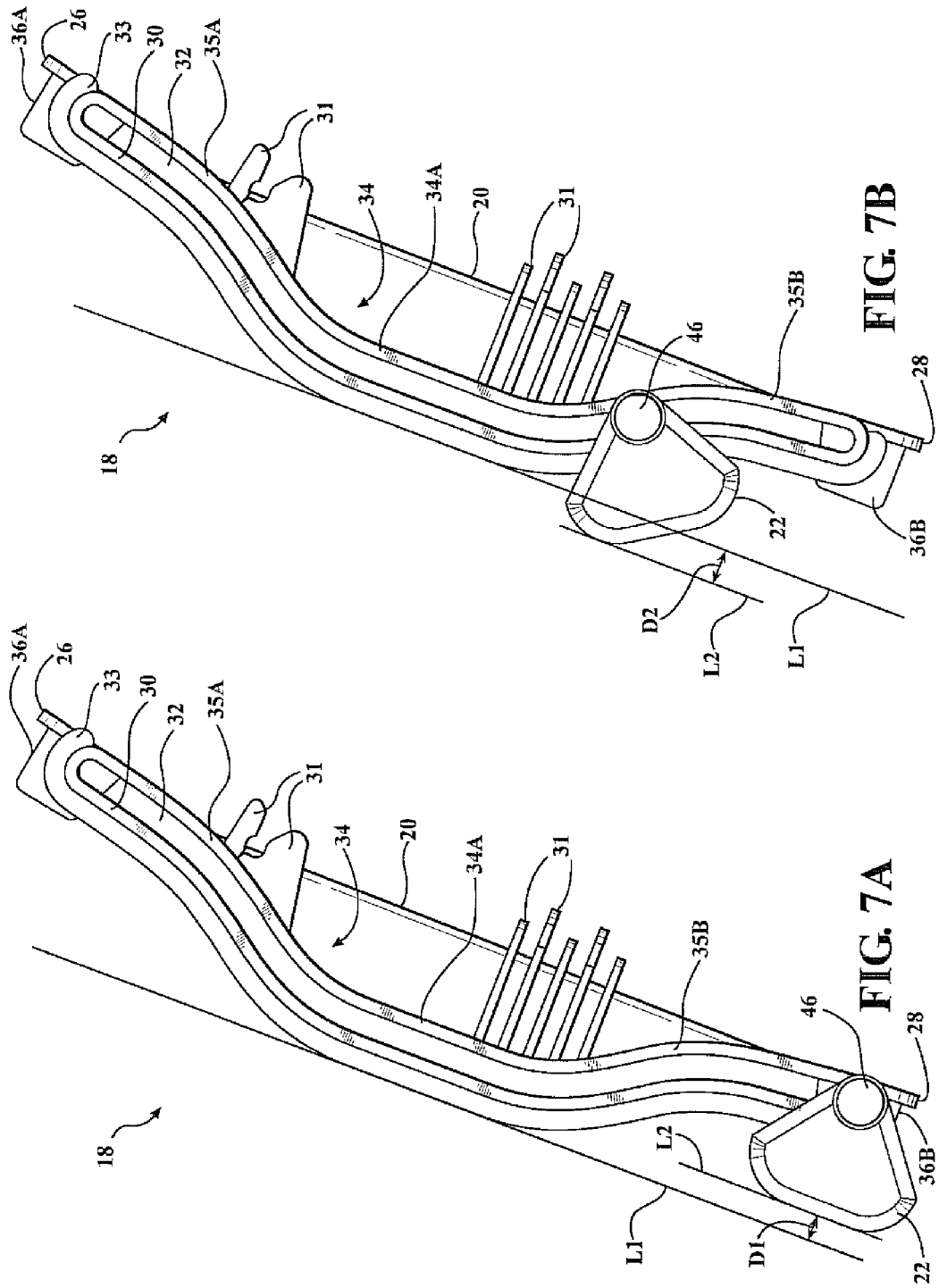

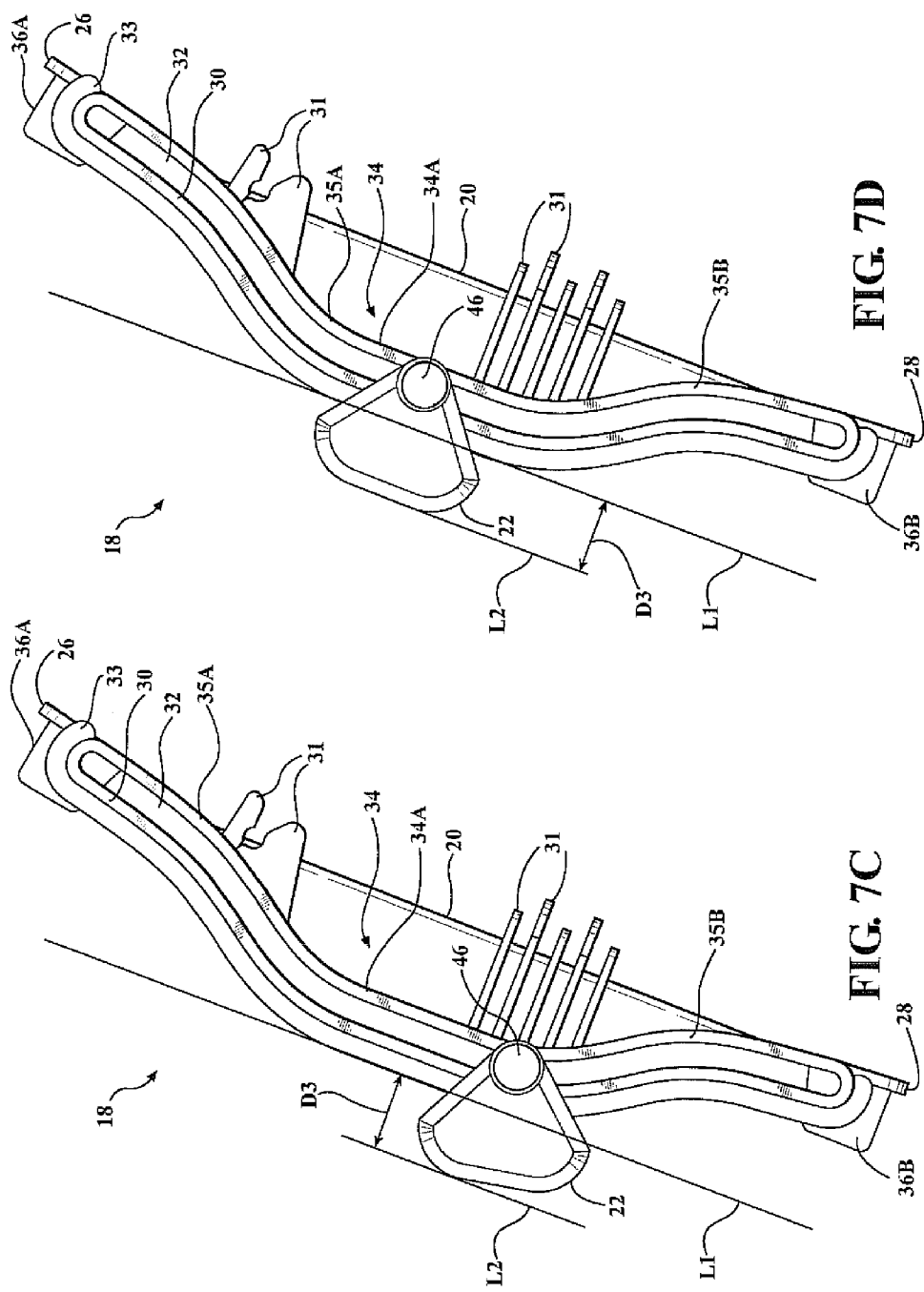

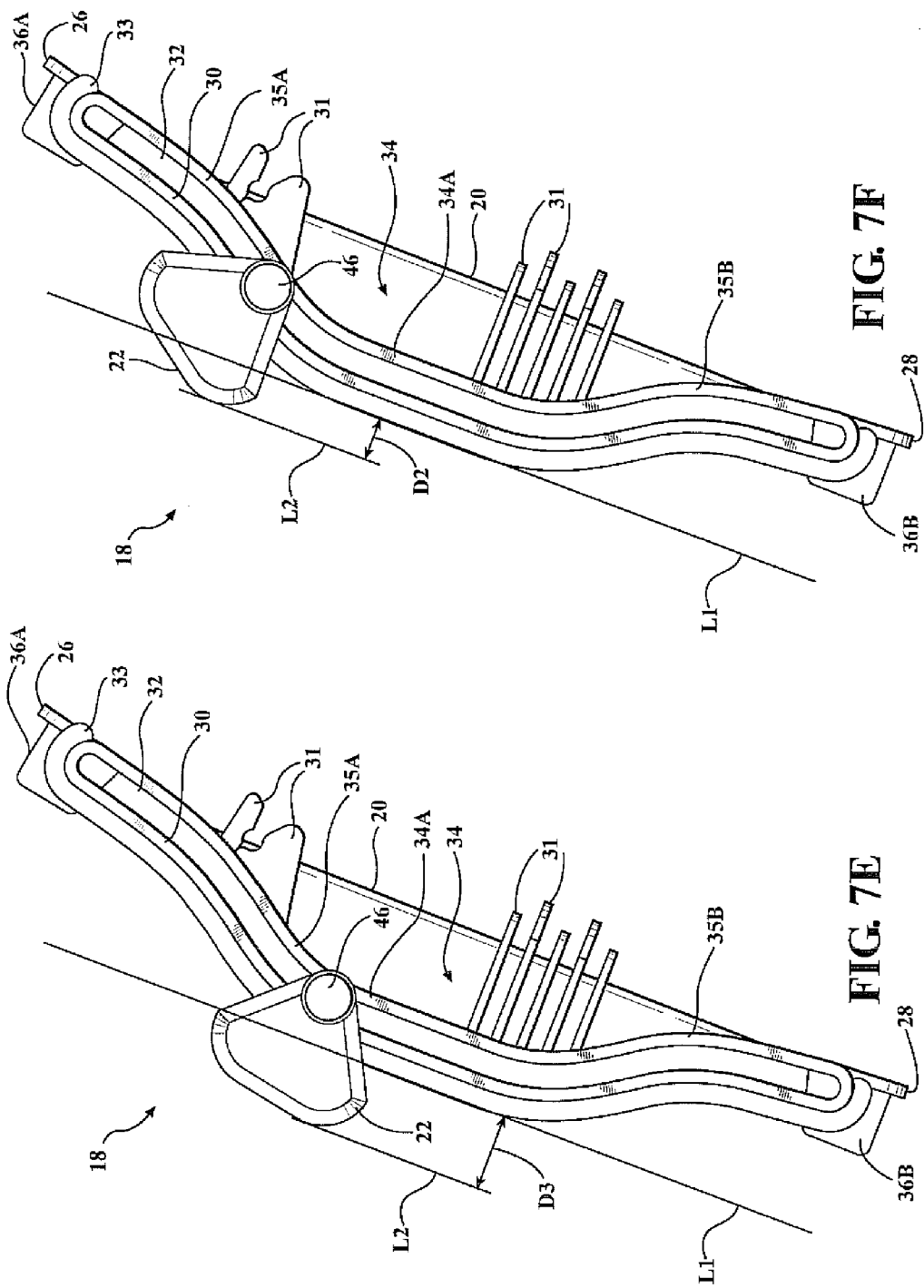

VARIABLE LUMBAR SUPPORT ASSEMBLY

FIELD OF THE INVENTION

The present invention is related to a lumbar support assembly for a seatback of a vehicle seat. More particularly, a variable lumbar support assembly structured to allow for both vertical displacement and fore and aft displacement of a lumbar member using only a single actuator.

BACKGROUND OF THE INVENTION

Most modern automotive vehicles include seat assemblies having a lumbar support. The lumbar support allows a driver to actuate a mechanism to move a lumbar member in the fore and aft direction (i.e. the vehicle longitudinal direction) to provide support to the occupant's lumbar region. The lumbar support relieves lower back stress and provides an increased comfort level while in the vehicle. In order to accommodate occupants of varying sizes it has been known to provide the lumbar support that is displaceable in the vertical direction as well as the fore and aft direction, so as to place the displaced lumbar member at a proper vertical orientation selected by the occupant. However, these previously known systems have a number of disadvantages.

One such disadvantage is the increased cost of the previously known four-way moveable lumbar support assemblies. Specifically, the previously known lumbar support assemblies require an actuator to move the lumbar member in the fore and aft longitudinal direction and a second actuator to move the lumbar member in the vertical direction. The inclusion of two separate actuators, such as electronically controlled motors or hand-operated mechanisms increases the overall cost of the seat assembly. Further, the use of dual actuators increases the bulkiness of the lumbar support assembly requiring additional assembly time which increases both production and labor costs.

Thus, there exists a need for an improved lumbar support assembly having a configured solution source to allow both the vertical displacement and fore and aft displacement of a lumbar member without increasing weight and cost of the vehicle seat assembly.

SUMMARY OF THE INVENTION

The present invention provides an improved variable lumbar support assembly which overcomes the above-mentioned disadvantages under the previously known lumbar assemblies.

In brief, variable lumbar support assembly for a seatback of a vehicle seat assembly includes a support bracket and a lumbar member. The support bracket has an upper end, an opposite lower end, and a pair of side rails extending between the upper end and the lower end. The support bracket has a curved central portion positioned between the upper and the lower end. The lumbar member is slidingly attached to the pair of side rails of the support bracket. The slidingly attachment of the lumbar member along the pair of slide rails provides both a vertical displacement and a fore and aft displacement of the lumbar member.

The lumbar member is slideable along the side rails of the support bracket between a multitude of positions including a lower off position, a lower central on position, a central on position, an upper central on position, and an upper off position. Between the lower off position and the lower central on position the lumbar member is incrementally adjustable in both the vertical and the fore and aft directions. Similarly, the lumbar member is incrementally adjustable in both the vertical and the fore and aft directions between the upper off position and the upper central on position. Between the lower central on position and the upper central on position the lumbar member is incrementally adjustable in only the fore and aft direction.

In the lower off position and the upper off position, the lumbar member is in a fully retracted state such that the lumbar member does not extend beyond the central portion of the support bracket. In the lower central on position, the central on position, and the upper central on position, the lumbar member is at a fully extended position which extends beyond the central portion of the support bracket.

It is appreciated that the inventive lumbar support assembly is not limited to use in an automotive vehicle seat assembly and can be utilized in any field or environment in which the seat assembly having a seatback for supporting a back portion of an occupant is provided.

BRIEF DESCRIPTION OF THE DRAWINGS

A better understanding of the present invention will be had upon reference to the following detailed description when read in conjunction with the accompanying drawings, wherein like reference characters are referred to the like parts throughout the several views and in which:

FIGS. 7A-7G are partial side views of the lumbar support assembly with the lumbar member in various positions.

DETAILED DESCRIPTION OF THE PREFERRED EMBODIMENTS

The present invention has utility as a variable lumbar support assembly and a seatback assembly having the variable lumbar support assembly that provides both vertical displacement and fore and aft displacement of a lumbar member. By providing the lumbar support assembly with a support bracket having a curved central portion and a lumbar member that is slidingly attached to a pair of side rails extending on either of the support brackets from a lower end to an upper end, the inventive lumbar support assembly overcomes the disadvantage of the previously known lumbar support. Specifically, movement of the lumbar member along the side rails provides both vertical and fore and aft displacement of the lumbar member without the need of additional cost and the weight of a second actuator.

Figure 1:
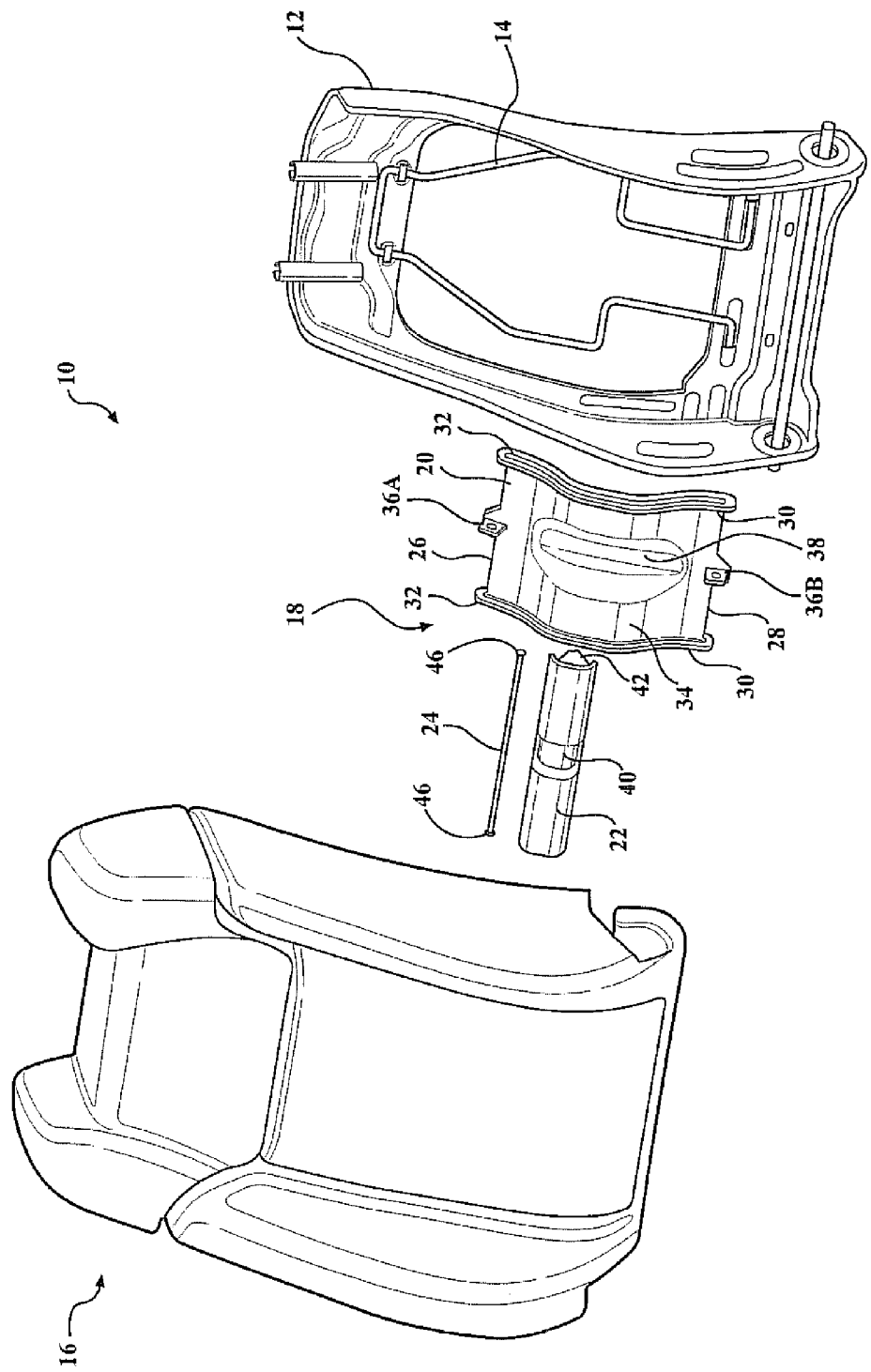
FIG. 1 is a front exploded perspective view illustrating the seatback of the seat vehicle seat assembly having the inventive lumbar support assembly.
Figure 6A:
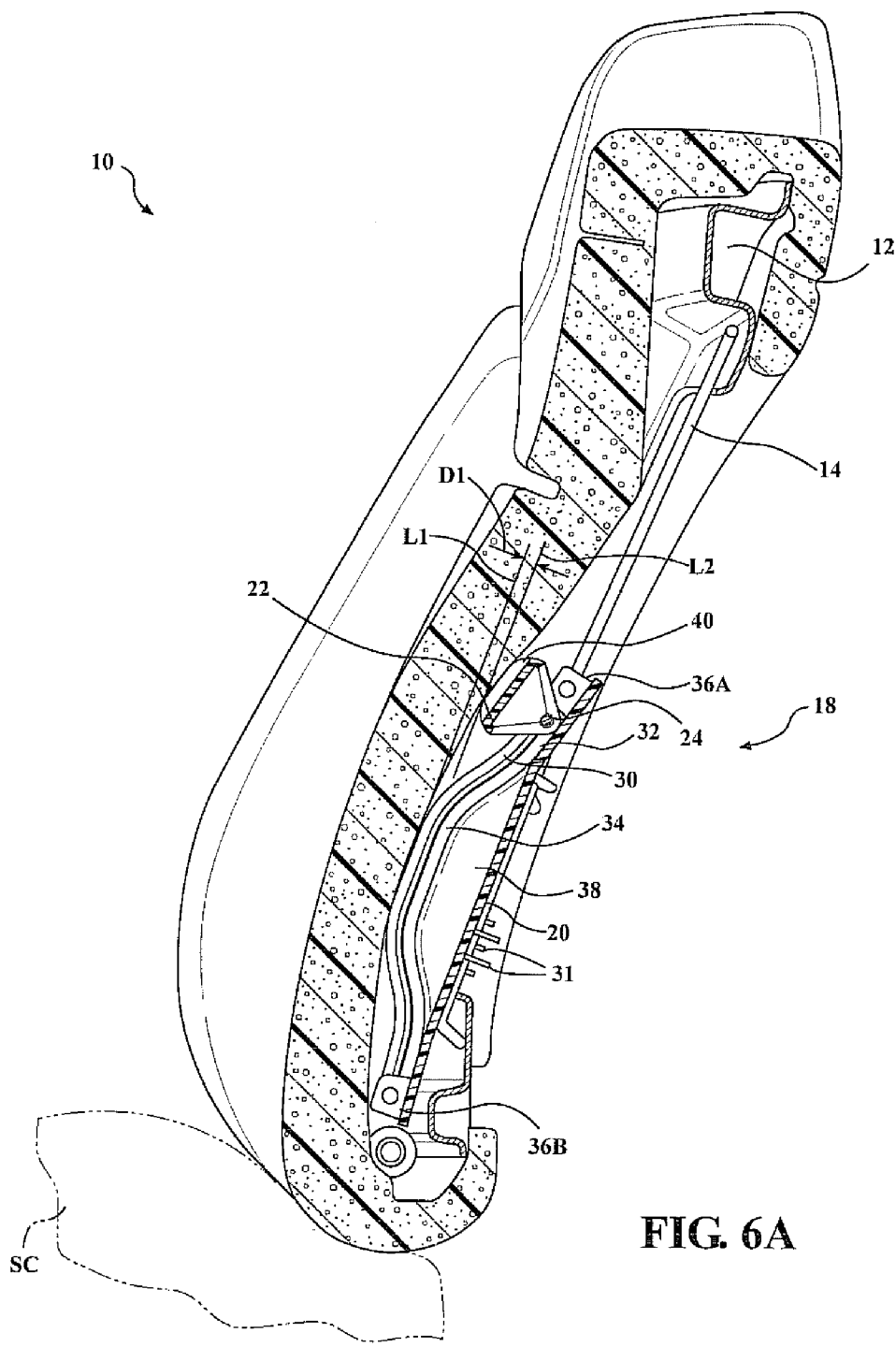
FIG. 6A is a partial cross-sectional view of the seatback assembly with the lumbar member in the upper off position.
Figure 6B:
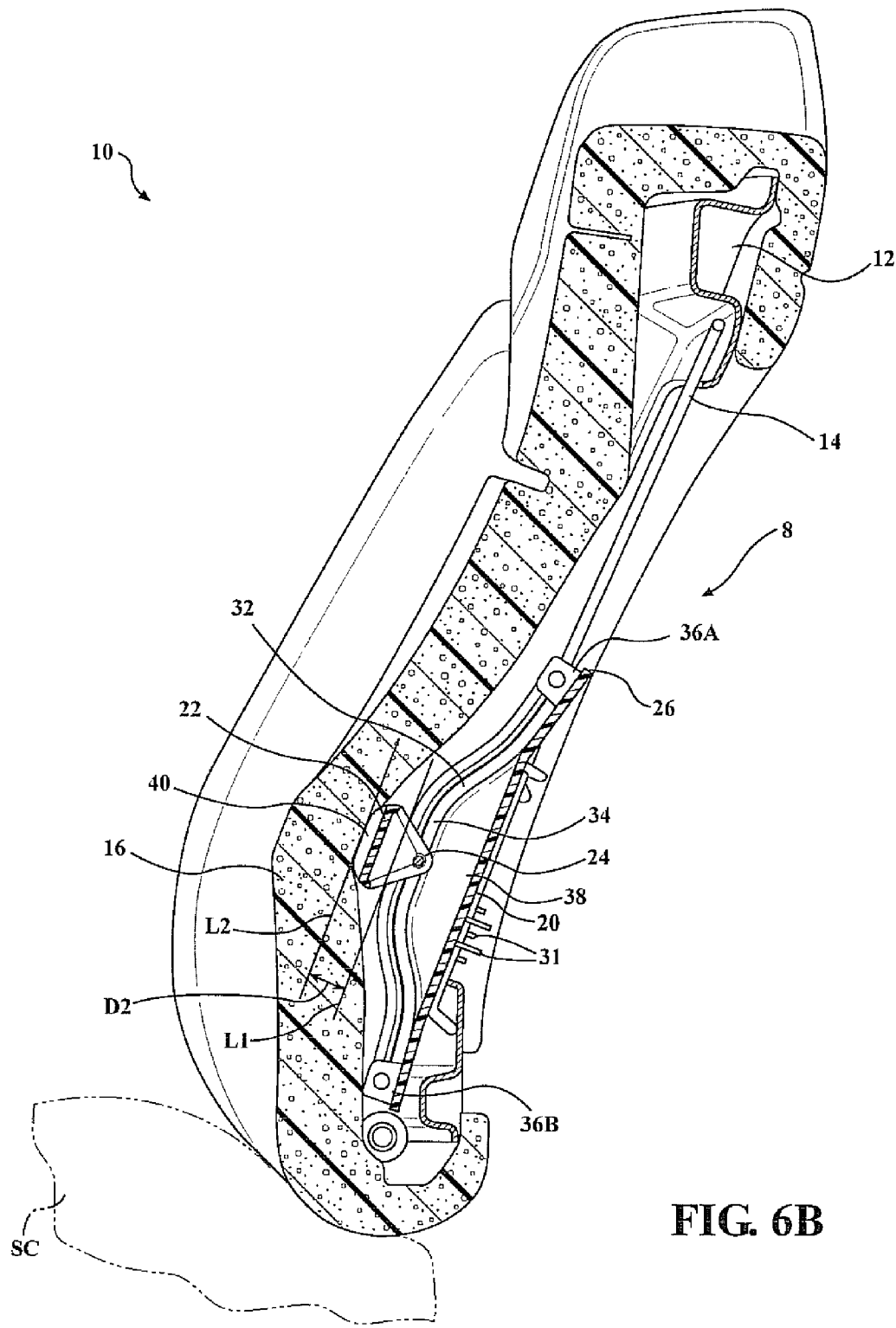
FIG. 6B is a partial cross-sectional view of the seatback assembly with the lumbar member in the central on position.

With reference to FIG. 1, a seatback assembly for supporting a back portion of an occupant in an automotive vehicle is generally illustrated at 10. The seatback assembly 10 includes a seatback frame 12 having a mounting wire 14, a seatback cushion 16 and a lumbar support assembly 18. The seatback assembly 10 further includes an occupant seat cushion SC, as seen in FIGS. 6A and 6B. The lumbar support assembly 18 is secured to the mounting wire 14 of the seatback frame 12. The seatback cushion 16 covers the seatback frame 12 to provide a cushion for the seatback assembly 10.

The lumbar support assembly 18 includes a support bracket 20 which is mounted to the mounting wire 14, and a lumbar member 22 slidingly attached to the support bracket 20 by a pin 24, as described in greater detail below. The support bracket 20 includes an upper end 26 and an opposite lower end 28. The support bracket 20 includes a pair of side rails 30. Each one of the pair of side rails 30 is positioned on either side of the support bracket 20. The pair of side rails 30 extend between the upper end 26 and the lower end 28. The pair of side rails 30 are spaced apart from a surface of the support bracket 20 so as to define a pair of guide slots 32 that extend between the upper end 26 and the lower end 28. A strengthening rib 33 extends generally normal from each of the side rails 30 to provide strength to the side rails 30 to resist fracture.

The support bracket 20 includes a curved central portion 34 generally having a curve or convex shape. As such, the curved central portion 34 is positioned forward in the vehicle longitudinal direction as compared to the upper end 26 and the lower end 28. Specifically, the support bracket 20 has a first direction and the curved central portion 34 bulges in a second direction which is generally normal to the longitudinal direction. In an effort to clarify the direction of the lumbar support assembly 18, the vehicle vertical direction is taken as the first direction of the support bracket 20 (i.e. a direction extending between the upper end 26 and the lower end 28) and the fore and aft (fore/aft) direction is taken as the second direction which extends generally normal to the first direction. As will be described in greater detail below, the first direction extends parallel to lines L1 and L2 and the second direction extends parallel with distances D1, D2, and D3 of FIGS. 7A-7G.

The curved central portion 34 includes a flattened portion 34A position between a pair of sloped portions 35A and 35B. The sloped portions 35A is positioned between the flattened portion 34A and the upper end 26, and the sloped portion 35B is positioned between the flattened portion 34A and the lower end 28. The side rails 30 are spaced apart from the support bracket 20 at a distance along the entire length of the support bracket such that the guide rails 30 correspond to the shape of the curved central portion 34 including the flattened portion 34A positioned between the sloped portions 35A and 35B.

Figure 2:
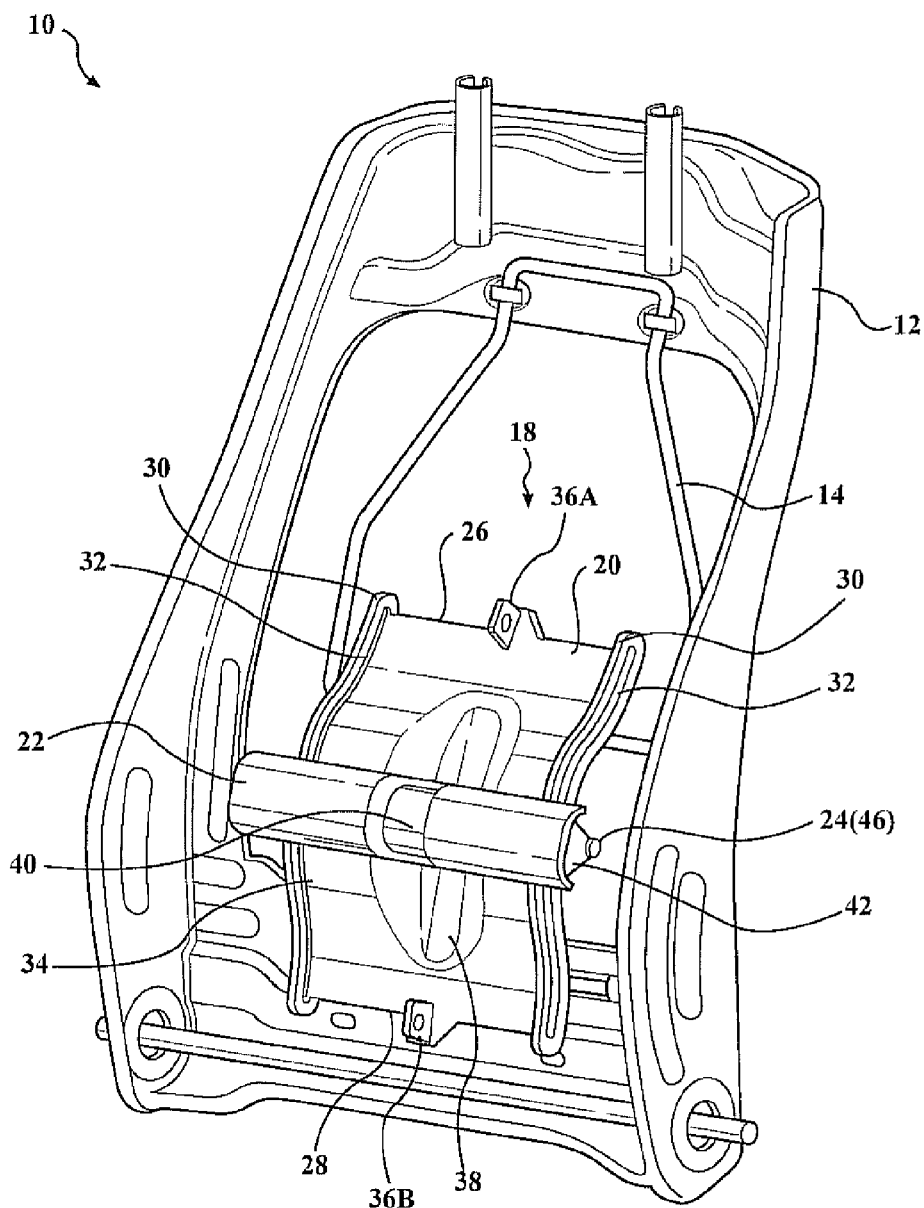
FIG. 2 is a perspective view of a seatback frame having the inventive lumbar support assembly.
Figure 4A:
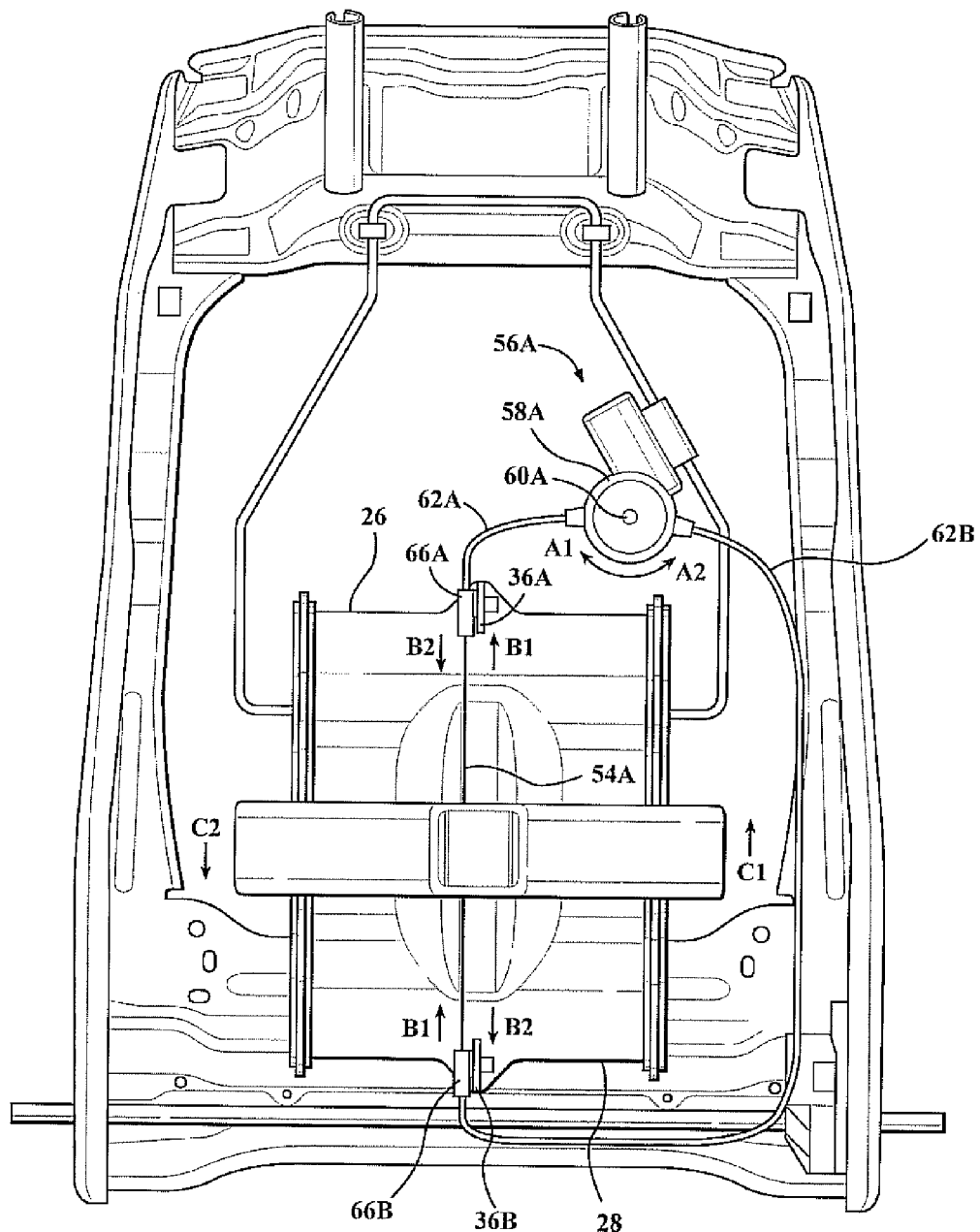
FIG. 4A is a front view of the seatback frame having the inventive lumbar support assembly including an electric actuator.
Figure 4B:
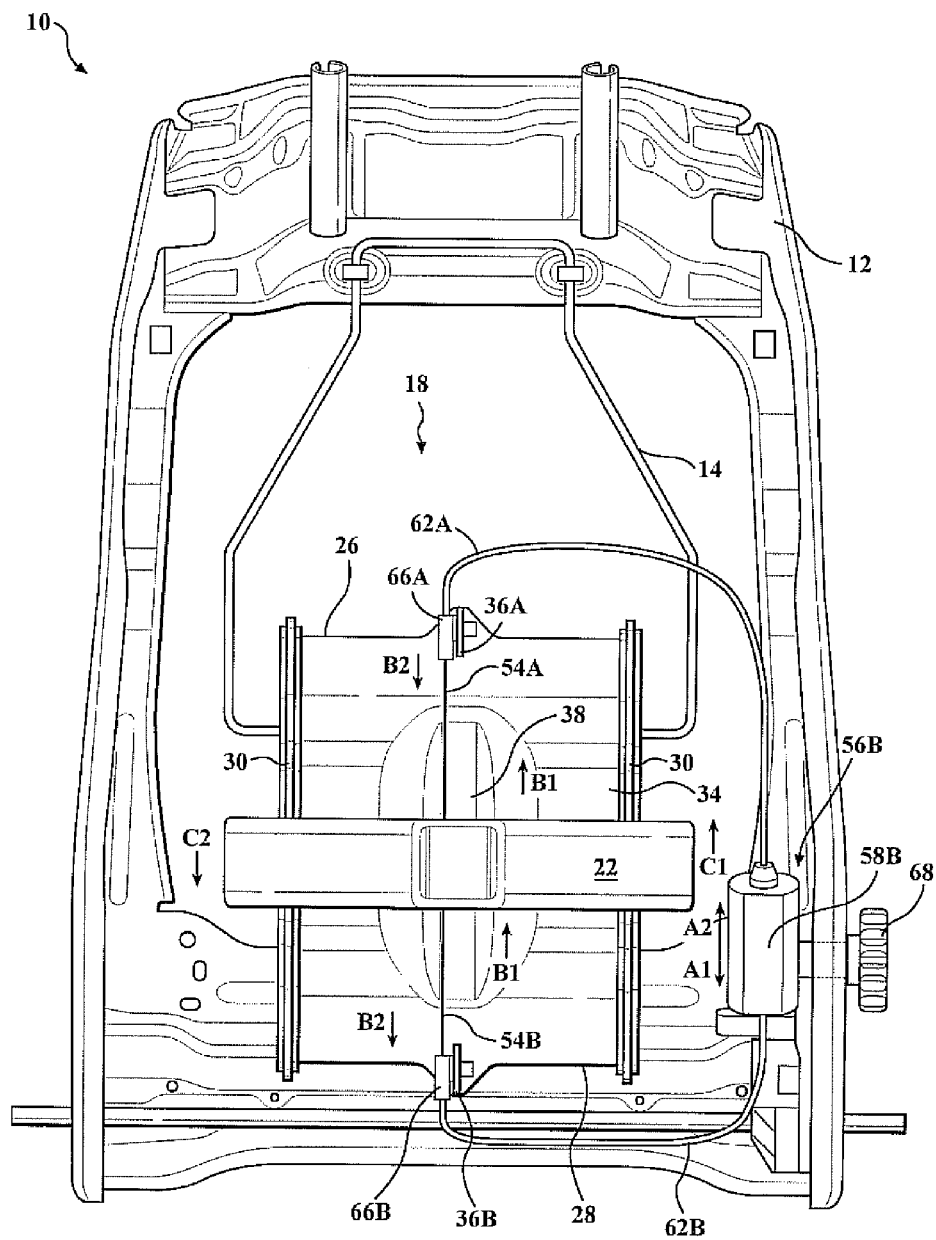
FIG. 4B is a front view of the seatback having the inventive lumbar support assembly including a hand operated actuator.

With reference to FIG. 2, the support bracket 20 includes a pair of stop tabs 36A and 36B. The pair of stop tabs 36A and 36B are provided at the upper end 26 and the lower end, 28, respectively. A spinal relief recess 38 extends through the curved central portion 34 along the first direction. As seen in FIGS. 4A and 4B, the stop tabs 36A and 36B along with the spinal relief recess 38 are centered in the width direction of the support bracket 20. The spinal relief recess 38 extends through the curved central portion 34 to reduce pressure on the occupant's spine when the back portion of the occupant rests against the seatback assembly 10.

Figure 3:
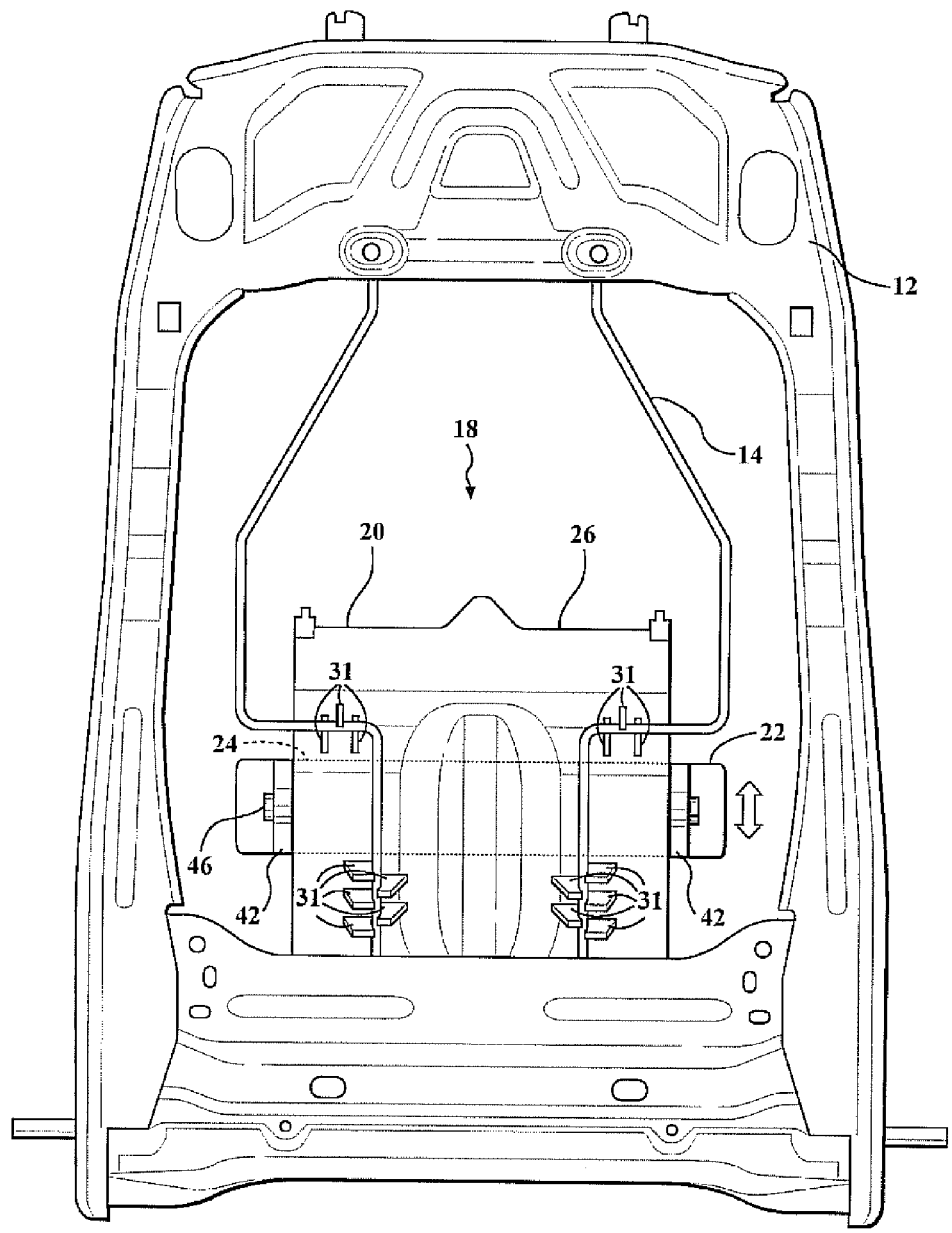
FIG. 3 is a rear view of the seatback frame having the inventive lumbar support assembly.

FIG. 3 depicts the rear face, in a vehicle longitudinal direction, of the support bracket 20. The support bracket 20 includes a plurality of opposing tabs 31. The opposing tabs 31 are in position so as to correspond to the mounting wire 14 such that the opposing tabs 31 provide a snap fit engagement of the support bracket 20 to the mounting wire 14 so as to secure the lumbar support assembly 18 to the seat frame 12.

Figure 5:
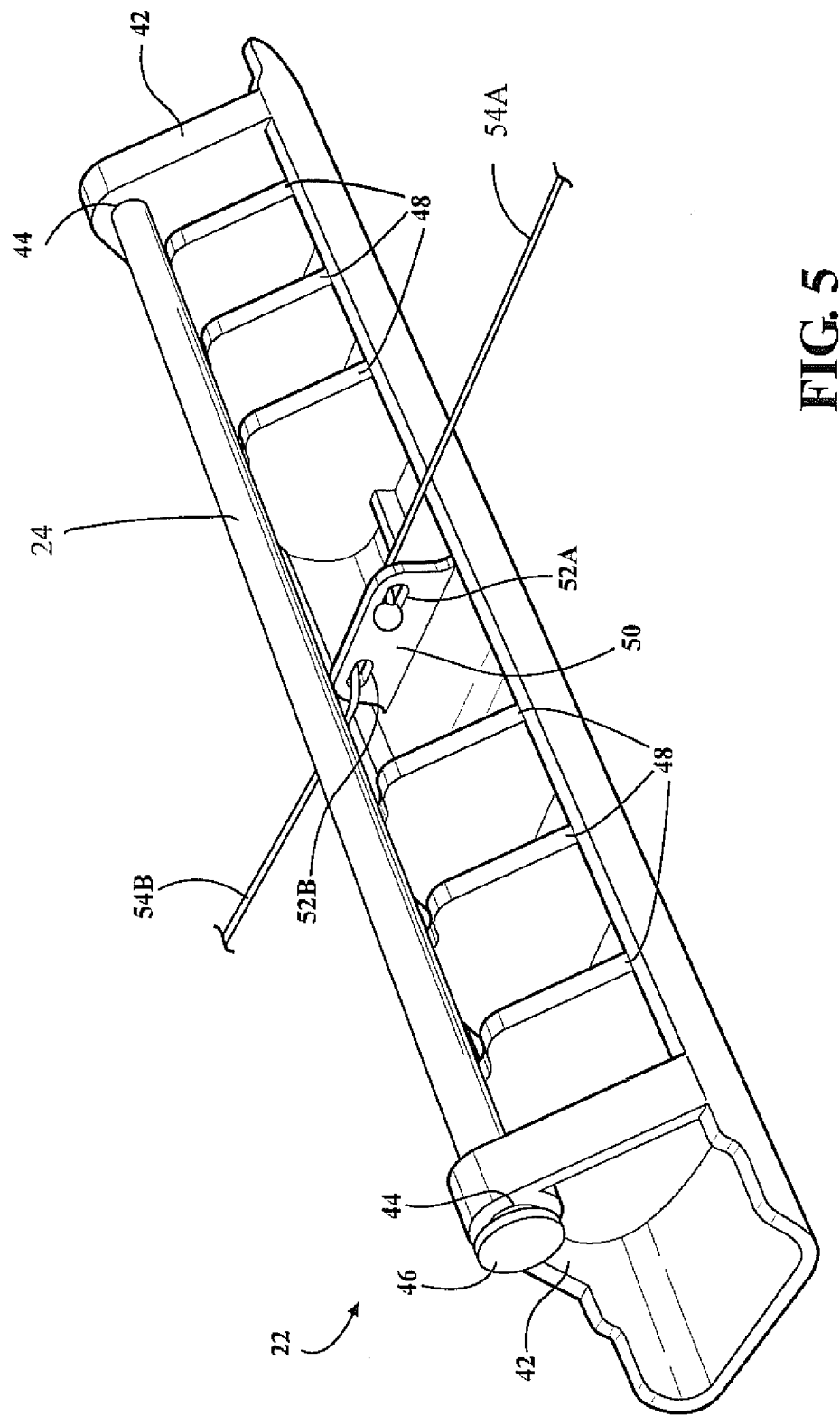
FIG. 5 is a rear perspective view of the lumbar member.

With reference to FIG. 5, the lumbar member 22 includes a pair of flanges 42 provided adjacent either end of the lumbar member 22. Each of the pair of flanges 42 includes an aperture 44 through which the pin 24 extends. The pin 24 includes a pair of end caps 46 thereby restraining the pin 24 to the lumbar member 22. The lumbar member 22 further includes a plurality of support ridges 48 extending from a rear surface of the lumbar member 22. The plurality of support ridges 48 supports the central portion of the pin 24. A corresponding lumbar member spinal relief recess 40 is provided in the lumbar member 22 so as to correspond with the spinal release relief 38 formed in the support bracket 20.

The lumbar member 22 is slidingly attached to the support bracket 20 using the pin 24. Specifically, the lumbar member 22 is aligned with the support bracket 20 such that the apertures 44 formed on the flanges 42 of the lumbar member 22 correspond with the guide slots 32 of the support bracket 20. The pin 24, with one of the end caps 46 removed, is inserted through the apertures 44 and the guide slots 32 and the end cap 46 is replaced to provide an interference engagement between the pin 24 and the guide slots 32 of the support bracket 20 and the pin 24 thereby restraining the lumbar member 22 to the support bracket 20. Specifically, each one of the pair of side rails 30 is positioned between one of the end caps 46 and one of the flanges 42. It is appreciated, of course, that the slidingly engagement of the lumbar member 22 and the support bracket 20 by the pin 24 is not limited to such a configuration, and includes placement of the flanges 42 on either outer side of the side rails 30.

A connection tab 50 is centered on the rear surface of the lumbar member 22. The connection tab 50 includes a pair of apertures 52A and 52B. Each of the apertures 52A and 52B are connected to ends 54A and 54B, respectively, to a connection member 54. The connection member 54 is optionally a cable such as a Bowden cable.

With reference to FIGS. 4A and 4B, the actuation of the lumbar member 22 along the guide slots 32 of the support bracket will now be discussed. In FIG. 4A, an actuation mechanism 56A is provided. The actuation mechanism 56A is in the form of an electronically controlled motor. The actuation mechanism 56A includes a reel 58A which rotates about a central axis 60A to wind the connection member 54 about the reel 58A. The connection member 54 includes opposing ends 54A and 54B which are secured to the apertures 52A and 52B, respectively, of the connection tab 50 formed on the rear surface of the lumbar member 22. The connection member 54 is in the form of a pair of broken cables having housings 62A and 62B. The housing 62A has one end attached to the reel 58A and an opposite end attached to the stop tab 36A by a connector 66A. The housing 62B has one end attached to the reel 58A and an opposite end attached to the stop tab 36B by a connector 66B. The stop tabs 36A and 36B act as stoppers for the lumbar member 22 as the connection tab 50 will contact the stop tabs 36A and 36B thereby preventing future movement beyond the upper off position and the lower off position, as explained in greater detail below.

Activation of the actuation mechanism 56A, by a control switch (not shown), rotates the reel 58A in the direction of arrow A1 which pulls the end 54A of the connection member 54 in the direction of the arrow B1 thereby sliding the lumbar member 22 in the direction of C1. The winding of the connection member 54 in the direction of arrow A1, unwinds a portion of the connection member 54 adjacent end 54B in the direction of arrow B1 thereby providing the slack for the lumbar member 22 to be pulled by the pulling of the connection element along arrow C1. As such, the lumbar member 22 is vertically displaced in an upwards direction.

Conversely, actuation of the actuation mechanism 56A, by the control switch (not shown), rotates the reel 58A in the direction of arrow A2 which pulls the end 54B of the connection member 54 in the direction of the arrow B2 thereby sliding the lumbar member 22 in the direction of C2. The winding of the connection member 54 in the direction of arrow A2, unwinds a portion of the connection member 54 adjacent end 54A in the direction of arrow B2 thereby providing the slack for the lumbar member 22 to be pulled by the pulling of the connection element along arrow C2. As such, the lumbar member 22 is vertically displaced in a downward direction.

In an alternative configuration, the seatback assembly 10 is provided with an actuation mechanism 56B in the form of a hand operated mechanism. The actuation mechanism 56B includes reel 58B, as described above, and a handle 68. Actuation of the handle 68 operates the actuation mechanism 56B in a similar manner as actuation of the electronically controlled motor of the actuation mechanism 56A.

Activation of the actuation mechanism 56B, by rotation of the handle 68, rotates the reel 58B in the direction of arrow A1 which pulls the end 54A of the connection member 54 in the direction of the arrow B1 thereby sliding the lumbar member 22 in the direction of C1. The winding of the connection member 54 in the direction of arrow A1 unwinds a portion of the connection member 54 adjacent end 54B in the direction of arrow B1 thereby providing the slack for the lumbar member 22 to be pulled by the pulling of the connection element along arrow C1. As such, the lumbar member 22 is vertically displaced in an upwards direction.

Conversely, actuation of the actuation mechanism 56B, by rotation of the handle 68, rotates the reel 58A in the direction of arrow A2 which pulls the end MB of the connection member 54 in the direction of the arrow B2 thereby sliding the lumbar member 22 in the direction of C2. The winding of the connection member 54 in the direction of arrow A2, unwinds a portion of the connection member 54 adjacent end 54A in the direction of arrow B2 thereby providing the slack for the lumbar member 22 to be pulled by the pulling of the connection element along arrow C2. As such, the lumbar member 22 is vertically displaced in a downward direction.

Figure 7G:
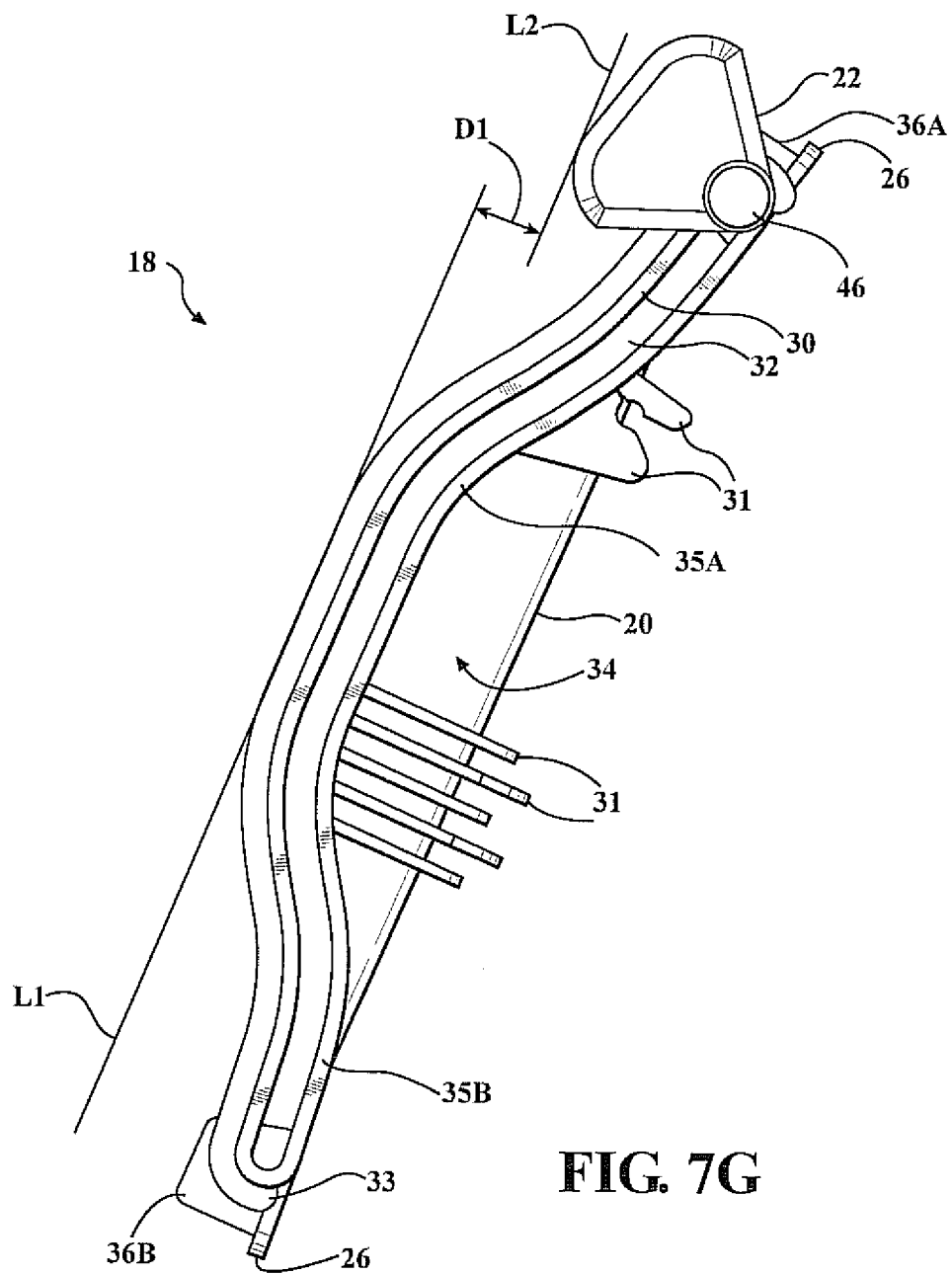

The displacement of the lumbar member 22 in the first and second directions will be described. With reference to FIGS. 7A and 7G the lumbar member 22 is in a lower off position and upper off position, respectively, in which the lumbar member 22, as indicated by line L2, does not extend beyond a forward most portion of the supporting bracket 20 as indicated by line L1. In the lower off position and the upper off position, the lumbar member 22 is spaced from the line L1 by a distance D1. FIG. 6A depicts a cross sectional view of the seat assembly 10 with the lumbar member 22 in the upper off position. In the upper off position and the lower off position, the lumbar member 22 does not displace the seatback cushion 16.

As seen in FIG. 7A the lumbar member 22 is in the lower off position, and upon actuation of the actuation mechanism 56A or 56B, the lumbar member 22 slides in the first direction. In FIG. 7B the lumbar member 22 is at a lower initial on position in which the lumbar member 22 begins to slide up the sloped portion 35B which displaces the lumbar member 22 in both the first direction and the second direction by following the contour of the support bracket 20, specifically the sloped potion 35B. On further displacement of the lumbar member 22, in the first direction the lumbar member 22 will be guided by the guide slots 32 along the sloped portion 35B such that increased vertical displacement further increases the displacement of the lumbar member 22 in the second direction. Specifically, the lumbar member 22 line L2 extends beyond the outermost portion line L1 of the support bracket 20 by distance D2. Movement along the sloped portion 35A in the first direction continuously increases the displacement of the lumbar member 22 in the second direction until the lumbar member 22 reaches the flattened portion 34A.

As seen in FIG. 7C the lumbar member 22 is in the lower central on position. Movement of the lumbar member 22 in the first direction between the lower initial on position, as seen in FIG. 7C, the central on position, as seen in FIG. 7D, and the upper central on position, as seen in FIG. 7E, only provides for a displacement of the lumbar member 22 in the first direction. Specifically, as the flattened portion 34A has a flat shape, the distance between the lumbar member 22 line L2 and the outermost portion line L1 of the support bracket is consistent at distance D3. This provides a fully on, that is full displacement of the lumbar member 22 in the second direction, with the movement of the lumbar member 22 in the first direction so that the occupant can selectively position the height of the lumbar member 22 in the fully on state.

Movement of the lumbar member 22 between the upper initial on position, as seen in FIG. 7F, and the upper off position, as seen in FIG. 7G, provides displacement of the lumbar member 22 in both the first and second directions. Specifically, as the lumbar member 22 slides down the guide slot 32 of the sloped portion 35A, the lumbar member 22 is displaced upwardly in the first direction and rearwardly in the second direction. The rearwardly displacement of the lumbar member 22 reduces the second direction displacement from distance D3, as the fully on position, to distance D2 which is continuously variable to the upper off position.

The configuration of the lumbar support assembly 18 provides the occupant with a range of vertical displacement of lumbar member 22 between the lower off position and the upper off position. Between the lower off position and the upper off position, the occupant is provided with a selectable fore/aft displacement of the lumbar member 22 in the second direction. With reference to FIG. 6B, the lumbar member 22 is provided in the central on position, which displaces the seatback cushion 16 away from the support bracket 20 thereby providing the occupant with lumbar support.

It will be appreciated of course, at the present invention is not limited to use with a seat assembly of an automobile vehicle. The lumbar support assembly is capable of providing lumbar support in any type of seatback assembly having a seatback for supporting the back of an occupant. From the foregoing, it can be seen that the present invention provides a variable lumbar support assembly and a seat assembly having a seatback including the lumbar support assembly which allows for the displacement of a lumbar member in both the vertical and the before and after reaction to the use of only a single actuation mechanism. However, many modifications thereto will become apparent to those of ordinary skill in the art to which it pertains without delineations of the invention as defined in the scope of the impending claims.

It is claimed:

1. A variable lumbar support assembly for a seatback seat assembly, said lumbar support comprising:
    a support bracket having an upper end and an opposite lower end, and a pair of side rails extending between said upper end and said lower end; said support bracket having a curved central portion, said support bracket having a first longitudinal direction; and
    a lumbar member slidingly attached to said pair of side rails of said support bracket, upon sliding movement of said lumbar member along said pair of side rails over said curved central portion said lumbar member is displaced in said first longitudinal direction and a second direction that is generally normal to said first direction.

2. The variable lumbar support assembly of claim 1, wherein said curved central portion includes a flattened portion extending between a pair of sloped portions.

3. The variable lumbar support assembly of claim 2, wherein each of said pair of side rails is spaced apart from a surface of said support bracket to define a continuous guide slot on either side of said support bracket, said guide slots extending between said upper end and said lower end of said support bracket.

4. The variable lumbar support assembly of claim 3, wherein said lumbar member is an elongated member extending across either side of said support bracket, said lumbar member slidably engaged within said guide slots to provide displacement of said lumbar member in said first longitudinal direction and said second direction.

5. The variable lumbar support assembly of claim 4, wherein as said lumbar member slides along said pair of guide rails within said pair of guide slots along either of said pair of sloped portions of said central portion said lumbar member is displaced in said first longitudinal direction and said second direction.

6. The variable lumbar support assembly of claim 5, wherein as said lumbar member slides along said pair of guide rails within said pair of guide slots along said flattened portion said lumbar member is displaced in the first longitudinal direction.

7. The variable lumbar support assembly of claim 6, wherein said lumbar member includes a pin engaged within said guide slots to slidably attach said lumbar member to said pair of guide rails of said support bracket.

8. The variable lumbar support assembly of claim 7, wherein said lumbar member includes a pair of tabs at either end, said pair of tabs having an aperture, said pin extends through said pair of tabs and said guide slots to slidingly engage said lumbar member with said support bracket.

9. The variable lumbar support assembly of claim 8, wherein said support bracket includes a spinal relief recess traversing said central portion of said support bracket.

10. The variable lumbar support assembly of claim 9, wherein said lumbar member includes a lumbar spinal relief recess that aligns with said spinal relief recess of said support bracket.

11. A seatback assembly for supporting an occupant, said seat assembly comprising:
a seatback frame;
a seatback cushion covering said seatback frame;
a support bracket secured to said seatback frame, said support bracket having an upper end and an opposite lower end, and a pair of side rails extending between said upper end and said lower end; said support bracket having a curved central portion; and
a lumbar member slidingly attached to said pair of side rails of said support bracket, upon sliding movement of said lumbar member along said pair of side rails over said curved central portion said lumbar member is displaced in said first longitudinal direction and a second direction that is generally normal to said first direction.

12. The seatback assembly of claim 11, wherein said curved central portion includes a flattened portion extending between a pair of sloped portions.

13. The seatback assembly of claim 12, wherein each of said pair of side rails is spaced apart from a surface of said support bracket to define a continuous guide slot on either side of said support bracket, said guide slots extending between said upper end and said lower end of said support bracket.

14. The seatback assembly of claim 13, wherein said lumbar member is an elongated member extending across either side of said support bracket, said lumbar member slidably engaged within said guide slots to provide displacement of said lumbar member in said first longitudinal direction and said second direction.

15. The seatback assembly of claim 14, wherein as said lumbar member slides along said pair of guide rails within said pair of guide slots along either of said pair of sloped portions of said central portion said lumbar member is displaced in said first longitudinal direction and said second direction.

16. The seatback assembly of claim 15, wherein as said lumbar member slides along said pair of guide rails within said pair of guide slots along said flattened portion said lumbar member is displaced in the first longitudinal direction.

17. The seatback assembly of claim 16, wherein said lumbar member includes a pin engaged within said guide slots to slidably attach said lumbar member to said pair of guide rails of said support bracket.

18. The seatback assembly of claim 17, wherein said lumbar member includes a pair of tabs at either end, said pair of tabs having an aperture, said pin extends through said pair of tabs and said guide slots to slidingly engage said lumbar member with said support bracket.

19. The seatback assembly of claim 18, wherein said support bracket includes a spinal relief recess traversing said central portion of said support bracket.

20. The seatback assembly of claim 19, wherein said lumbar member includes a lumbar spinal relief recess that aligns with said spinal relief recess of said support bracket.

* * * * *